US012583319B2

(12) United States Patent
Ahmed et al.

(10) Patent No.: US 12,583,319 B2
(45) Date of Patent: Mar. 24, 2026

(54) SYSTEM AND METHOD FOR DIMMING DISPLAYS IN AUTOMOTIVE VEHICLE

(71) Applicant: FORD GLOBAL TECHNOLOGIES, LLC, Dearborn, MI (US)

(72) Inventors: Hanan J. Ahmed, Belleville, MI (US);
Michael Duke, Livonia, MI (US);
Stuart C. Salter, White Lake, MI (US);
Todd Ansbacher, Westland, MI (US);
John R. Van Wiemeersch, Novi, MI (US); Brendan F. Diamond, Grosse Pointe, MI (US)

( * ) Notice: Subject to any disclaimer, the term of this patent is extended or adjusted under 35 U.S.C. 154(b) by 138 days.

(21) Appl. No.: 18/581,739

(22) Filed: Feb. 20, 2024

(65) Prior Publication Data

US 2025/0262936 A1     Aug. 21, 2025

(51) Int. Cl.
*B60K 35/235*     (2024.01)

(52) U.S. Cl.
CPC ...... *B60K 35/235* (2024.01); *B60K 2360/349* (2024.01)

(58) Field of Classification Search
CPC .................................................. G02B 27/0172
See application file for complete search history.

(56) References Cited

U.S. PATENT DOCUMENTS

| | | | |
|---|---|---|---|
| 7,571,038 B2 | 8/2009 | Butler et al. | |
| 10,120,438 B2 | 11/2018 | Osman et al. | |
| 2014/0002256 A1* | 1/2014 | Hoshiba | F01L 1/34 |
| | | | 340/441 |
| 2015/0169053 A1 | 6/2015 | Bozarth et al. | |
| 2016/0239071 A1* | 8/2016 | Yang | G06F 1/3265 |
| 2017/0192629 A1* | 7/2017 | Takada | G06F 3/017 |
| 2017/0225617 A1* | 8/2017 | Morimura | G06V 40/10 |
| 2017/0277258 A1* | 9/2017 | Ma | G09G 5/10 |
| 2020/0039438 A1* | 2/2020 | Umezawa | G02B 27/0101 |
| 2024/0087256 A1* | 3/2024 | Hylak | G06F 3/012 |

FOREIGN PATENT DOCUMENTS

| | | | |
|---|---|---|---|
| CN | 116524877 A | 8/2023 | |
| DE | 102007025531 A1 | 12/2008 | |
| JP | 07061257 A * | 3/1995 | ............. B60K 35/00 |
| JP | 2006219000 A | 8/2006 | |
| JP | 2008225216 A | 9/2008 | |
| JP | 5098438 B2 | 12/2012 | |
| JP | 6669956 B2 | 3/2020 | |
| JP | 7268526 B2 | 5/2023 | |

* cited by examiner

*Primary Examiner* — Nan-Ying Yang
(74) *Attorney, Agent, or Firm* — Frank Lollo; Eversheds Sutherland (US) LLP

(57)     ABSTRACT

A display system in a vehicle is operated to reduce power consumption by adaptively dimming display screens according to where a user is looking. The display system has a plurality of display objects each with a respective adjustable brightness. The passenger vehicle includes a gaze tracker evaluating an eye of a user to detect a gaze point where the user is looking. The gaze point is compared to locations of the display objects. A respective gaze frequency is determined for one or more of the display objects according to a number of times that the gaze point orients onto a respective display object. The adjustable brightness of the respective display object is adjusted according to the respective gaze frequency.

22 Claims, 4 Drawing Sheets

SYSTEM AND METHOD FOR DIMMING DISPLAYS IN AUTOMOTIVE VEHICLE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to displays for human-machine interfaces in transportation vehicles, and, more specifically, to controlled dimming of display screens for reducing electrical power consumption in a vehicle.

Advanced electronics and communications technologies appearing in vehicles has resulted in the common use of multiple illuminated displays/monitors deployed in the vehicles for the driver and passengers. These may include display panels, touchscreen displays, and heads-up displays which can each consume a significant amount of electrical power. A vehicle instrument panel (i.e., dashboard) may include four or more individual displays. In some cases, very large screens are used which can occupy a large fraction of the instrument panel. Consequently, the electrical power draw can become large enough to impact vehicle performance. For example, a drivable range of a vehicle may be significantly reduced. In a gas-powered vehicle, the current drawn by display screens may also reduce the power reserve held in a storage battery to a level that is unable to support the starting of the gasoline engine and/or the miles per gallon (mpg) performance may be reduced.

Dimming the brightness which is being output by a display unit can reduce the amount of electrical power being consumed. Some displays may be used which are capable of dimming only specified portions of a display screen. It is known to monitor a driver to determine when the driver is looking at a particular screen, and then dimming the screen when the driver is not actually looking at it. However, the recognition time of a control system may be slow which may force the driver to wait a brief time for the desired screen to actually turn fully on. Known dimming of screens has not appropriately taken into account driver habits in looking at various kinds of information or the fact that the relationship between the speed of recognition for the driver or other user to understand the display contents and the brightness and other presentation characteristics of the display is a complex relationship.

SUMMARY OF THE INVENTION

Illuminated displays may depict "cluster" information that is required to be displayed by governing regulations (e.g., functional safety information in compliance with ISO 26262). Such regulatory-required information and other information which a vehicle manufacturer determines to make continuously available is referred to herein as primary content. Other information which is not required to be continuously displayed is referred to herein as secondary content.

To reduce electrical power consumption by a dimmable display system, any display objects (i.e., any separately dimmable display screen or portion of a display screen)

having primary content are shown at normal brightness and display objects having secondary content are dimmed until they are gazed at. The dimming may be set at any selected reduction of brightness, including fully off. The reduction may be dynamically determined as described herein. Furthermore, when a display object becomes undimmed then a dynamic brightness boost may also be applied in some embodiments.

In one aspect of the invention, a vehicle apparatus comprises a display system having a plurality of display objects each with a respective adjustable brightness and a gaze tracker evaluating an eye or eyes of a user to detect a gaze point where the user is looking. A controller is configured to (A) compare the gaze point to locations of the display objects, (B) determine a respective gaze frequency for one or more of the display objects according to a number of times that the gaze point orients onto a respective display object, and (C) adjust the adjustable brightness of the respective display object according to the respective gaze frequency.

DETAILED DESCRIPTION OF PREFERRED EMBODIMENTS

Figure 1:
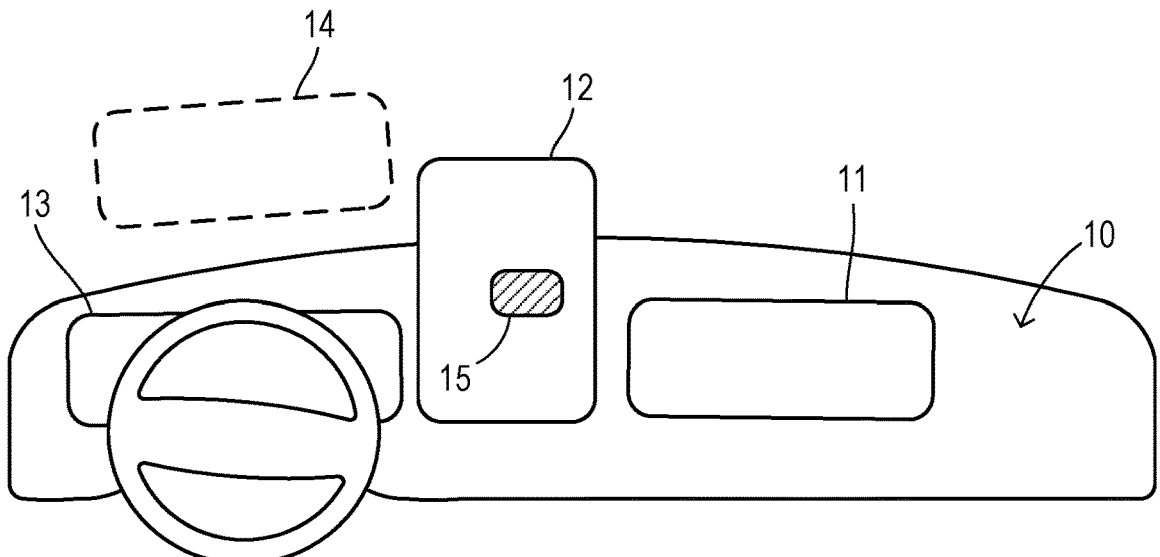
FIG. 1 is a schematic view of a vehicle interior cabin including a plurality of display units providing a plurality of display objects.

In the present invention, display objects (e.g., screens, parts of a screen, or parts of multiple screens) are set to a default dimming when they contain secondary content and then they selectively have their brightness increased according to a user's (e.g., driver's) gaze point. An increase in brightness enables symbols, letters, and words to be seen and recognized. Recognition speed and accuracy may be proportional to the brightness (below a certain point where further increase in brightness does not further decrease recognition time. Other factors may also impact recognition speed and accuracy such as text font size (but again only up to a particular font size). Light color (e.g., enhanced blue light and diminished red light), font design, and special effects (e.g., bolding, underlining, font changes, or other highlights), which are collectively referred to herein as "styles," can all accentuate the display contents to improve recognition.

Thus, screen brightness may be dimmed to conserve power when not being used and then undimmed based on driver behavior. Brightness used for the undimming may be determined based on a gaze frequency. For example, screen brightness (typically a PWM power setting) may be set based on frequency of gaze change between a particular screen and the road. For example, a secondary navigation screen (e.g., showing a map and directions) at which the driver is frequently glancing may be kept at a higher intensity (e.g., higher than the dimmed level) while the frequency glancing lasts, rather than just turning it on when glanced at since this provides a more comfortable experience.

In another aspect of the invention, a typical length of gaze toward a particular display object may determine a brightness boost or style used for the display object whenever the gaze length is likely to be very short. Brief gazes which occur when a user is quickly scanning for important information can benefit from having an increased reading speed. Faster recognition can be fostered using brightness (e.g., an intensity boost) or a change in color or other style during the brief glance. The magnitude of an intensity boost can be determined according to the dilation of the driver's pupils (e.g., using a look-up table). Color changes may go from reddish colors to white or blueish colors to enable rapid recognition/reading.

Relationships between display brightness and gaze frequency or length of gaze can be based on the role of the user in the vehicle whose gazed is being determined (e.g., driver, a passenger acting as a navigator, or a non-participating occupant). Brightness relationships can also take into account the type of content being displayed or a state of the vehicle (e.g., parked, forward/reverse gear position, or speed of travel). In some embodiments, when the vehicle is parked (or not moving), all the display objects could be undimmed (e.g., set to the global display brightness) for maximum accessibility of all information and functions. For example, upon detecting a motionless state in response to a gear position or a speed monitor, the adjustable brightness may be restored to an increased brightness for any respective display objects that were previously dimmed.

Referring to FIG. 1, a vehicle is shown with an instrument panel 10 which includes a display system having a display unit 11, display unit 12, and display unit 13 mounted on instrument panel 10. The display system may further include a heads-up display 14 which is projected onto or from a windshield or other transparent surface, for example. Each display unit is selectively dimmable in order to (1) provide appropriate illumination according to ambient conditions and (2) control power consumption by the display units as needed. A particular display unit may be dimmable across its entire illuminated surface or may include portions which are separately dimmable such as a screen portion 15 on display unit 12. Each region having a respective adjustable brightness is referred to herein as a display object.

Figure 2:
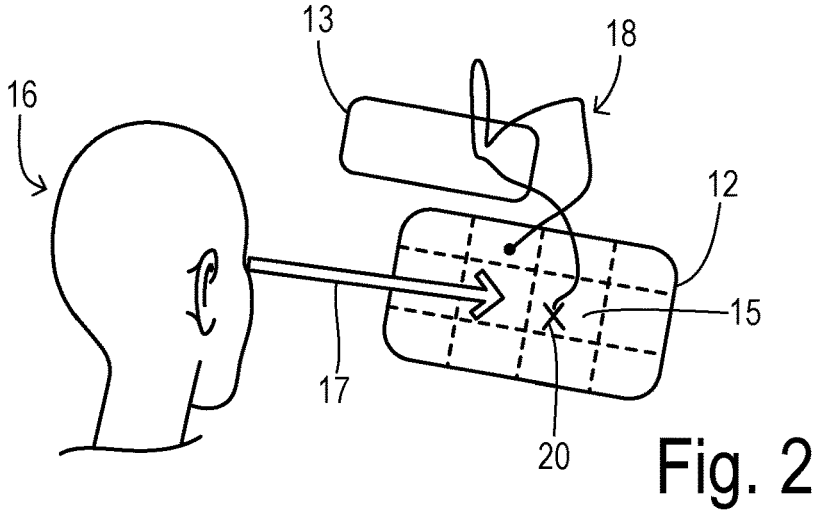
FIG. 2 is a schematic diagram showing a path of a gaze point traversing over and around various display objects.

FIG. 2 illustrates a driver 16 or other user whose eyes are directed along a line-of-sight 17, defining a gaze point 20 where line-of-sight 17 intersects an object such as display unit 12. As known in the art, the eyes of a driver 16 can be monitored (e.g., using visible-light or infrared camera images) to perform gaze tracking to follow a path 18 of gaze point 20 over time as the driver performs the tasks of driving (including looking at display units 12 and 13, for example). In an embodiment of the invention, display unit 12 has separate display objects such as display object 15. A single display unit having a plurality of display objects may be laid out according to a grid of respective dimmable regions, each of which may be separately coincident with gaze point 20 at different times. As explained below, display objects such as display object 15 may be dimmed or undimmed in response to the scanning of gaze point 20.

Dimming of all or a subset of the display units may be controlled according to a global dimming control in which a commonized screen brightness is defined according to ambient conditions such as daylight or nighttime conditions. Global dimming provides an appropriate visibility (e.g., in response to measured ambient light levels) and may further include adjustments within a permitted range which are made by a driver. The present invention may provide further dimming for the purpose of maintaining an electrical power reserve (e.g., based on battery charge margin).

The display units may display primary content and/or secondary content as defined above. The brightness of primary content may be unaffected by the incremental dimming as provided in the present invention. In other words, while primary content may be shown at an adjustable brightness determined on a global basis for all display units, it is preferably exempt from the further modifications of the present invention so as to maintain full-time visibility under pertinent regulations.

Figure 3:
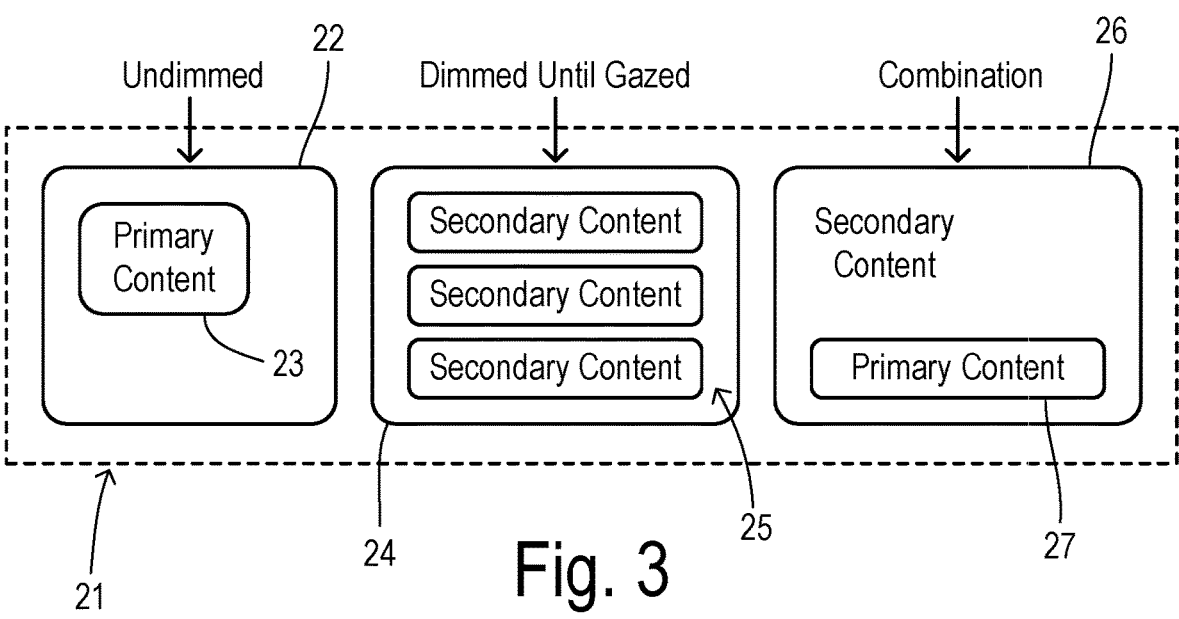
FIG. 3 is a front view of display objects including objects which display primary content and secondary content.

As shown in FIG. 3, a display system 12 may include the display units 22, 24, and 26. Display unit 22 depicts only primary content 23 and is therefore considered to be undimmed by the present invention (even though primary content/display unit 22 utilizes a global brightness setting). A display unit 24 shows a plurality of separate instances of secondary content 25 which may be further dimmed until gazed at. Thus, secondary content 25 may be dimmed even more than indicated by the global setting (including fully dimmed or zero brightness). Subsequently, when separately-dimmable regions (display objects) of secondary content 25 are gazed upon, then their brightness may be increased as high as the current global brightness setting or even higher. Display unit 26 shows a combination of secondary content and primary content 27. As long as the respective display objects are separately dimmable, primary content 27 can remain undimmed while other display objects depicting secondary content can be dimmed until gazed at.

Figure 4:
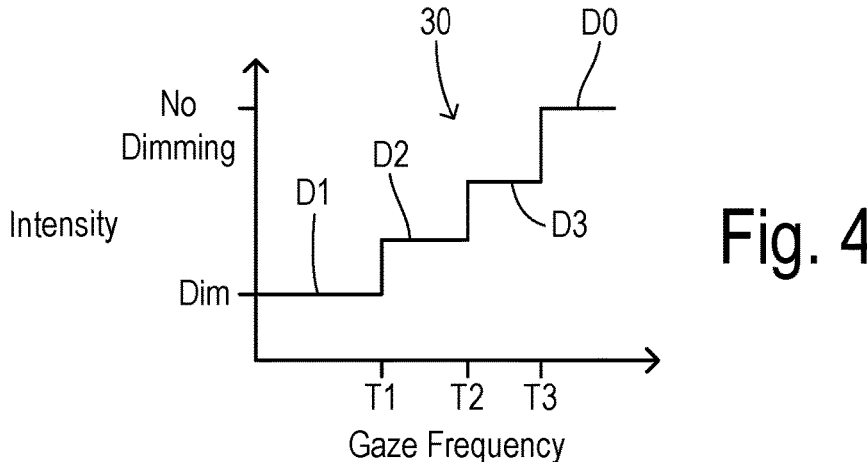
FIG. 4 is a graph showing increased display intensity (i.e., brightness) according to gaze frequency for a display object.

The amount of incremental dimming provided by the invention may be inversely proportional to a gaze frequency at which the driver glances onto a particular dimmable display object. The relationship may be a stepwise relationship as shown in FIG. 4 wherein a stepped curve 30 shows a relationship between gaze frequency and display intensity. A low gaze frequency causes the greatest amount of dimming (i.e., the lowest adjusted brightness) and, in this example, the highest gaze frequency results in no incremental dimming. Gaze frequency may be characterized as the number of times when the gaze point reorients onto a respective display object during a predetermined period of time. The gaze frequency may be determined as a running average over the predetermined period of time, for example. In FIG. 4, when the gaze frequency is below a first threshold T1, display intensity may be dimmed to a dimming level D1 which is the lowest screen intensity being used (e.g., zero brightness or other fixed low value). For gaze frequency between threshold T1 and a threshold T2, intensity of the corresponding display object is set at an intermediate dimming level D2. For gaze frequency between threshold T2 and a threshold T3, screen intensity is set to a further intermediate dimming level D3. When gaze frequency is above threshold T3, intensity is set to no dimming (a dimming level D0). Accordingly, significant power savings can be achieved while ensuring that the driver experience when accessing the display system for secondary content is barely diminished.

In another aspect of the brightness control of the invention, an expected gaze duration for respective display objects is utilized to boost a dimmed display object at the moment when the driver begins to gaze upon that display object. The modification introduced to the display object at the moment the gaze first orients onto the display object may be comprised of selecting a "style" of the display object which can vary between an accentuating appearance or a regular appearance. Alternatively, the modification may include an intensity or brightness adjustment. The expected gaze duration may preferably be an average duration of the time that the gaze point lingers upon a particular display object when looked at. If the driver tends to only utilize short glances at a particular display object, then it is desirable to quickly increase the corresponding readability and to reduce the recognition time for the contents of the respective display object. If the gaze point in a particular instance lingers on the display object longer than a predetermined period (e.g., based on a sufficient time for recognition by the user), it may be restored to its regular appearance. Whenever a particular display object is dimmed as a result of the driver/user turning their gaze away from the display object, the dimming is preferably performed gradually so that the act of dimming does not draw the attention of the driver/user.

Figure 6:
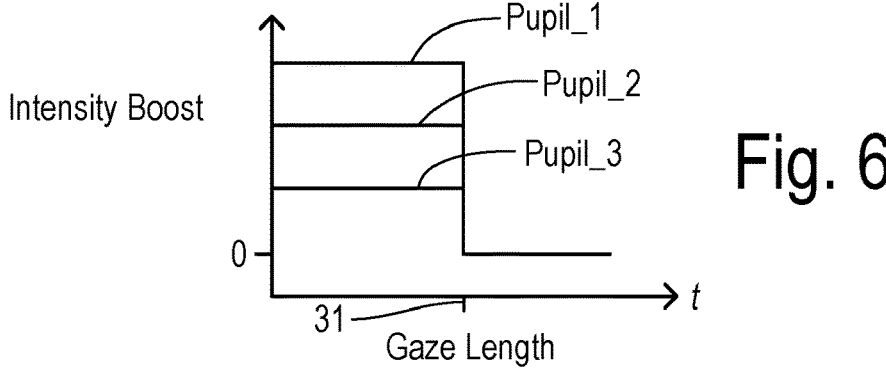
FIG. 6 is a graph showing an intensity boost applied during initial stages of gazing at a display object according to a pupil size of an eye of the user.
Figure 5:
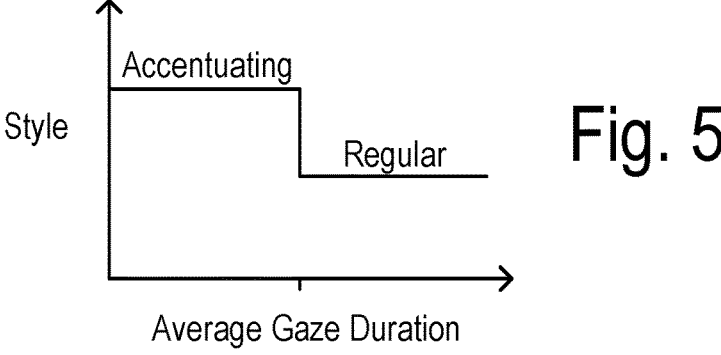
FIG. 5 is a graph showing variation of text style for a display object according to an average gaze duration.

Particular display contents may be accentuated by increasing brightness, changing color, and/or changing font. As shown in FIG. 5, a change in style between accentuating style and regular style occurs at a threshold average display duration. The threshold may be about 3 seconds, for example. When accentuating the display object includes a boost of the intensity or brightness of the display object, then the magnitude of the boost may be dynamically determined based on ambient conditions or based on the visual state of the driver, for example. As shown in FIG. 6, a magnitude of an intensity boost may be determined according to the driver's pupil size. A measured pupil size may be binned according to predetermined ranges. A largest range of pupil sizes may induce a largest intensity (Pupil_1 in FIG. 6). An intermediate range of pupil size results in an intermediate intensity boost Pupil_2. A pupil size in a lowest range of pupil sizes results in a smaller intensity boost Pupil_3. In the event that the driver continues to gaze at the display object which has been accentuated/boosted for greater than a predetermined period of time at a time threshold 30, then the intensity boost or other accentuation in the style may be removed (e.g., the intensity boost is gradually reduced to zero). In some embodiments, the brightness/intensity of a display object (e.g., secondary content) can be adjusted (e.g., further reduced gradually or immediately) when the driver or other user gazes at it for longer than a specified period in order to limit the length of time that the content occupies their attention.

Figure 7:
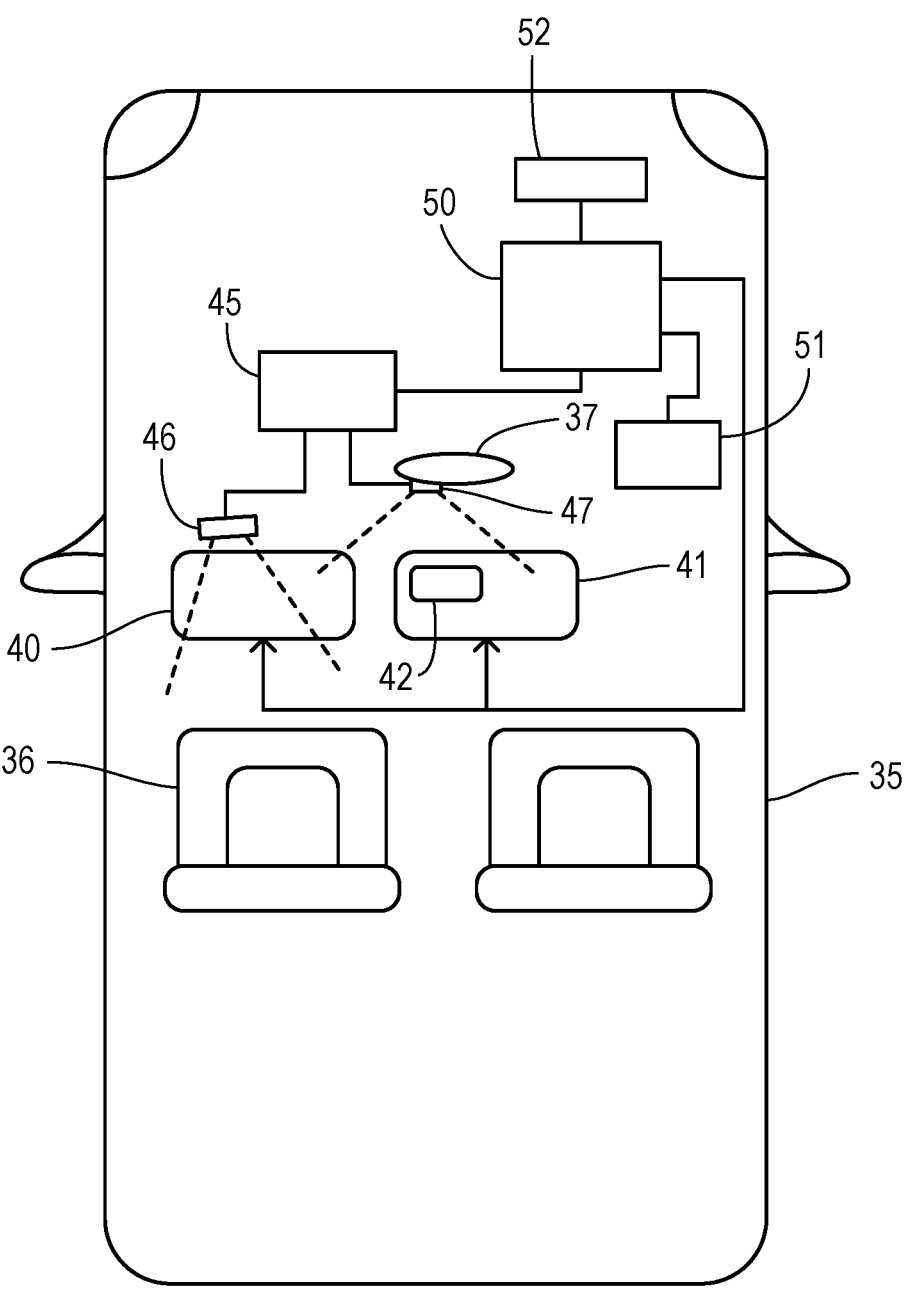
FIG. 7 is a block diagram showing an apparatus according to the present invention.

FIG. 7 shows a vehicle 35 in greater detail with a driver seat 36 where the driver can view a rearview mirror 37 and a display system having a display unit 40 and a display unit 41. Rearview mirror 37 (as well as sideview mirrors, not shown) can be comprised a mirror or another video display, wherein the video display(s) may also be dimmed as described herein. Display unit 40 may comprise a single display object while display unit 41 includes multiple display objects including a display object 42 which is separately dimmable.

Vehicle 35 includes a gaze tracking system (i.e., gaze tracker) comprised of a gaze controller 45 and cameras 46 and 47 for monitoring the driver in driver's seat 36 using methods known in the art. Various monitored parameters such as gaze point, gaze direction, and pupil size are reported by gaze controller 45 to a controller display controller 50. Controller 50 is connected to an electrical system monitor 51 which reports a charge margin or other states of a battery or other electrical storage system for use in determining global and incremental dimming of display objects as disclosed herein. Controller 50 is coupled to look-up tables 52 which are calibrated according to desired dimming of brightness and selected changes of accentuating styles of display objects based on different gaze frequencies, gaze durations, and other factors. Controller 50 is coupled to displays 40 and 41 in order to implement dimming and style changes.

Figure 8:
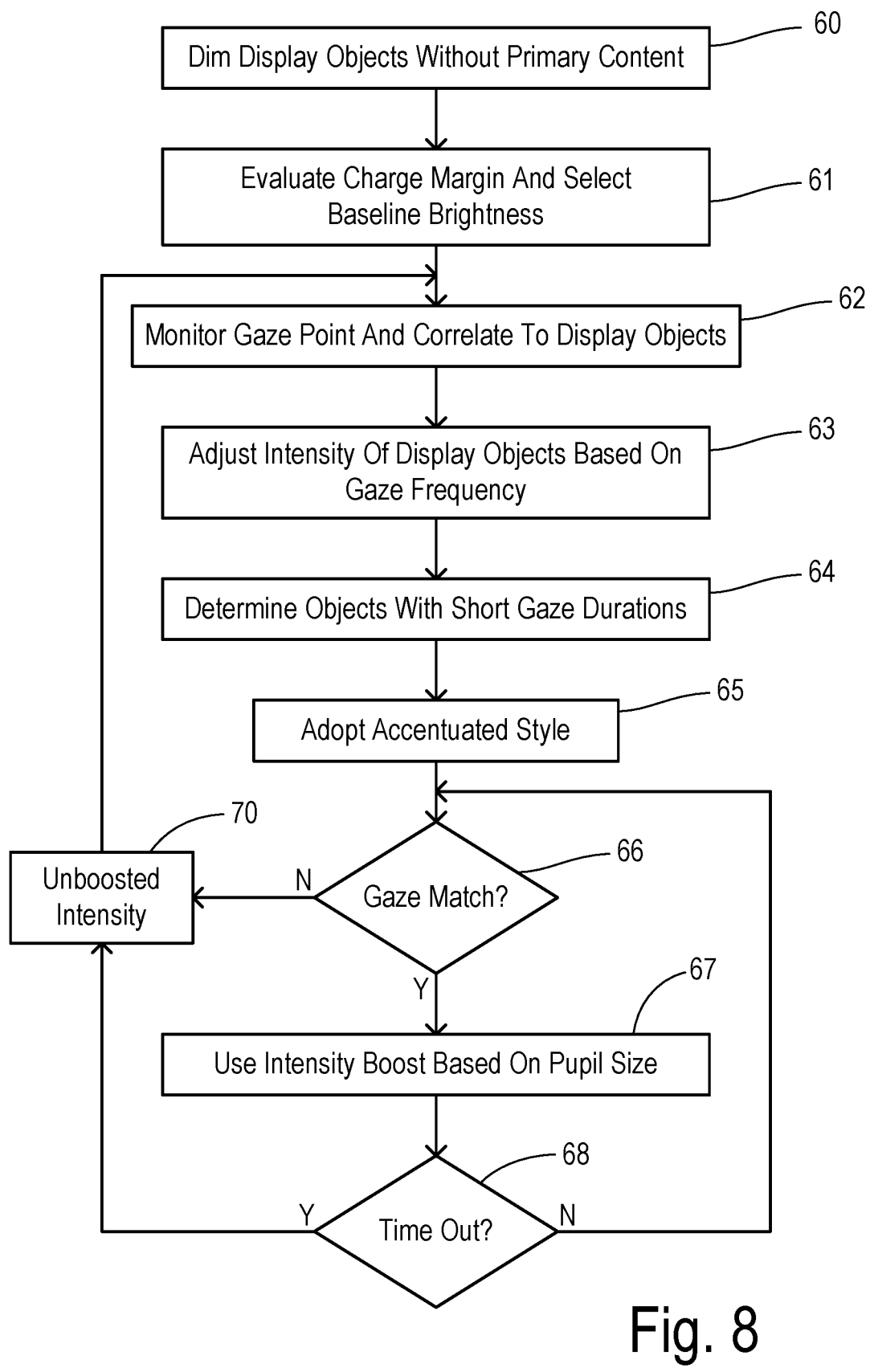
FIG. 8 is a flowchart showing a method according to one preferred method of the invention.

FIG. 8 is a flowchart showing one preferred embodiment of the invention. Display objects depicting primary content are set to an adjustable brightness a corresponding to a global dimming value. Initially, display objects depicting secondary content may be dimmed to a predetermined intensity (e.g., zero intensity) while the electrical state (e.g., charge margin) is evaluated in step 60. Once it becomes available, the charge margin or other aspects of the state of the electrical power system can be used to determine a baseline brightness (i.e., dimming) of respective display objects in step 61. The baseline dimming of different display objects may all be the same or may be different according to the priorities of secondary content or other factors such as the determined need for power conservation, aesthetics, or otherwise. Thus, the display system is set to a condition wherein power is conserved and the display is in a state of waiting for the driver to look at various display objects in order to undim objects according to the attention of the driver.

In step 62, a gaze point is monitored and correlated to each of the respective display objects. Over time, a gaze frequency and an average gaze duration is compiled for each respective display object while the gaze point is being tracked along a gaze path. In step 63, gaze frequency for each respective display object may be compared to various thresholds. When any particular threshold of gaze frequency is reached, then the respective display object has its intensity adjusted accordingly (e.g., frequently gazed objects have their intensity increased above their respective baseline). In step 64, the gaze path of the driver is evaluated to determine display objects wherein the driver on average only gazes for a short duration. For example, an average duration during which a gaze point lingers on a particular display object is averaged (e.g., a running average during a sliding window). For display objects with the short gaze duration, an accentuated style may be identified in step 65 (i.e., the accentuated style is identified in advance). In step 66, the gaze point is compared to the locations of display objects for which an accentuated style has been adopted. If the gaze point matches, then the adopted accentuated style is activated for the corresponding display object in step 67. The accentuation may include an intensity boost which is determined based on pupil size. While the accentuated style and/or intensity boost is active, a check is performed in step 68 to determine whether a time-out period has expired. If the specified period has expired then an unboosted intensity and the regular style are restored in step 70, and then a return is made to step 62. If the time out has not been reached in step 68, then a return is made to step 66 to continue to monitor the gaze point for the match with the respective display object. If the gaze point no longer matches the display object, then the intensity is unboosted and the regular style is restored in step 70.

What is claimed is:

1. Vehicle apparatus comprising:
   a display system having a plurality of display objects each with a respective adjustable brightness;

a gaze tracker evaluating an eye of a user to detect a gaze point where the user is looking; and a controller configured to (A) compare the gaze point to locations of the display objects, (B) determine a respective gaze frequency for one or more of the display objects according to a number of times that the gaze point orients onto a respective display object, and (C) adjust the adjustable brightness of the respective display object according to the respective gaze frequency, wherein the adjustable brightness is adjusted in (C) so that an increase in the gaze frequency corresponds to an increase in the adjustable brightness.

2. The vehicle apparatus of claim 1 wherein the controller is further configured to (D) compile lengths of time for events during which the gaze point orients onto a respective one of the display objects to determine an expected gaze duration, and (E) if the expected gaze duration is less than a predetermined threshold then accentuate the respective one of the display objects when the gaze point orients onto the respective one of the display objects.

3. The vehicle apparatus of claim 2 wherein accentuating the respective one of the display objects is comprised of increasing the adjustable brightness of the respective one of the display objects.

4. The vehicle apparatus of claim 3 wherein increasing the adjustable brightness of the respective one of the display objects is comprised of determining an intensity boost selected according to a pupil size measured for the eye of the user.

5. The vehicle apparatus of claim 3 wherein the increased adjustable brightness for the respective one of the display objects is subsequently dimmed after the gaze point orients away from the respective one of the display objects, and wherein the dimming is gradual.

6. The vehicle apparatus of claim 2 wherein accentuating the respective one of the display objects is comprised of altering a color of the respective one of the display objects.

7. The vehicle apparatus of claim 2 wherein the controller is further configured to (F) monitor an actual duration that the gaze point orients onto the respective one of the display objects that is being accentuated, and (G) discontinuing accentuating the respective one of the display objects when the actual duration exceeds a predetermined period of time.

8. The vehicle apparatus of claim 1 wherein the controller is further configured to determine a charge margin of an electrical source supplying the display system, and to select a baseline brightness of the display objects according to the charge margin.

9. The vehicle apparatus of claim 1 wherein a respective display screen included in the display system generates a plurality of the display objects for which brightness is independently adjustable.

10. The vehicle apparatus of claim 1 wherein the controller is further configured to (D) detect a motionless state in response to a gear position or a speed monitor, and (E) restore the adjustable brightness to an increased brightness for any respective display objects that were previously dimmed.

11. The vehicle apparatus of claim 1 wherein the display objects are adapted to display primary content and secondary content, and wherein adjusting the brightness according to the gaze frequency is applied to secondary content and is not applied to primary content.

12. A method for controlling a display system in a passenger vehicle, wherein the display system has a plurality of display objects each with a respective adjustable brightness, and wherein the passenger vehicle includes a gaze tracker evaluating an eye of a user to detect a gaze point where the user is looking, the method comprising the steps of:

comparing the gaze point to locations of the display objects;

determining a respective gaze frequency for one or more of the display objects according to a number of times that the gaze point orients onto a respective display object; and adjusting the adjustable brightness of the respective display object according to the respective gaze frequency, wherein the adjustable brightness is adjusted so that an increase in the gaze frequency corresponds to an increase in the adjustable brightness.

13. The method of claim 12 further comprising the steps of:

compiling lengths of time for events during which the gaze point orients onto a respective one of the display objects to determine an expected gaze duration; and if the expected gaze duration is less than a predetermined threshold, then accentuating the respective one of the display objects when the gaze point orients onto the respective one of the display objects.

14. The method of claim 13 wherein accentuating the respective one of the display objects is comprised of increasing the adjustable brightness of the respective one of the display objects.

15. The method of claim 14 wherein increasing the adjustable brightness of the respective one of the display objects is comprised of determining an intensity boost selected according to a pupil size measured for the eye of the user.

16. The method of claim 14 further comprising the step of:

gradually dimming the adjustable brightness of the respective one of the display objects when the gaze point orients away from the respective one of the display objects.

17. The method of claim 13 wherein accentuating the respective one of the display objects is comprised of altering a color of the respective one of the display objects.

18. The method of claim 13 further comprising the steps of:

monitoring an actual duration that the gaze point orients onto the respective one of the display objects that is being accentuated; and discontinuing accentuating the respective one of the display objects when the actual duration exceeds a predetermined period of time.

19. The method of claim 12 further comprising the steps of:

determining a charge margin of an electrical source supplying the display system; and selecting a baseline brightness of the display objects according to the charge margin.

20. The method of claim 12 wherein the plurality of display objects includes at least one display object encompassing a portion of a display screen included in the display system.

21. The method of claim 12 further comprising the steps of:

detecting a motionless state in response to a gear position or a speed monitor; and restoring the adjustable brightness to an increased brightness for any respective display objects that were previously dimmed.

22. The method of claim 12 wherein the display objects are adapted to display primary content and secondary content, and wherein adjusting the brightness according to the gaze frequency is applied to secondary content and is not applied to primary content.

* * * * *